(12) United States Patent
Stachewicz et al.

(10) Patent No.: US 9,849,757 B2
(45) Date of Patent: Dec. 26, 2017

(54) EXTRUDED MEMBER CORNER CONNECTION

(71) Applicant: Dura Operating, LLC, Auburn Hills, MI (US)

(72) Inventors: Aaron Brion Stachewicz, Harrison Township, MI (US); Alex Mark Langreet, Mt. Clemens, MI (US)

(73) Assignee: DURA Operating LLC, Auburn Hills, MI (US)

( * ) Notice: Subject to any disclaimer, the term of this patent is extended or adjusted under 35 U.S.C. 154(b) by 0 days.

(21) Appl. No.: 15/060,130

(22) Filed: Mar. 3, 2016

(65) Prior Publication Data
US 2017/0253110 A1    Sep. 7, 2017

(51) Int. Cl.
*E06B 7/16* (2006.01)
*B60J 5/04* (2006.01)

(52) U.S. Cl.
CPC .................... *B60J 5/0402* (2013.01)

(58) Field of Classification Search
CPC .................................. B60J 5/0402
USPC ......................... 49/479.1; 52/656.9
See application file for complete search history.

(56) References Cited

U.S. PATENT DOCUMENTS

| | | | | |
|---|---|---|---|---|
| 3,321,223 A | * | 5/1967 | Snow | E06B 3/9682 312/140 |
| 3,532,369 A | * | 10/1970 | Reilly | E04B 1/5831 403/176 |
| 3,717,955 A | * | 2/1973 | Urbanick | E06B 3/9644 49/479.1 |
| 3,837,957 A | * | 9/1974 | Mesnel | B29C 53/083 156/221 |
| 3,899,258 A | * | 8/1975 | Matthews | E06B 1/32 403/292 |
| 3,949,530 A | * | 4/1976 | Williams | E06B 3/62 264/145 |
| 4,010,573 A | * | 3/1977 | Andrzejewski | B60J 10/24 428/122 |
| 4,296,587 A | * | 10/1981 | Berdan | |
| 4,380,110 A | * | 4/1983 | Harig | A47G 1/10 228/142 |

(Continued)

FOREIGN PATENT DOCUMENTS

DE    9206562 U1    10/1992
DE   19730942 A1     1/1998

(Continued)

*Primary Examiner* — Jerry Redman
(74) *Attorney, Agent, or Firm* — Robert E. Ford; Raymond J. Vivacqua; Steven L. Crane

(57) ABSTRACT

A connecting device for coupling first and second members includes a body having a first leg and a second leg integrally connected to the first leg. The first leg and the second leg are oriented at an angle with respect to each other. A rigid material core extends through both the first leg and the second leg, the core including a first core member integrally connected to a second core member. The first core member is angularly oriented with respect to the second core member such that the core defines a geometric shape. A resilient material sleeve commonly covers the core of both the first leg and the second leg. The first leg is frictionally received in a first member and the second leg is frictionally received in a second member to couple the first member to the second member.

20 Claims, 6 Drawing Sheets

(56) References Cited

U.S. PATENT DOCUMENTS

| | | | | |
|---|---|---|---|---|
| 4,444,525 A * | 4/1984 | Alander | ............... | E06B 3/9845 160/381 |
| 4,683,634 A * | 8/1987 | Cole | ............... | E06B 3/667 29/412 |
| 4,910,918 A * | 3/1990 | Naples | ............... | B60J 10/21 49/441 |
| 4,993,775 A | 2/1991 | Keys | | |
| 5,003,741 A * | 4/1991 | Yeh | ............... | A47B 47/0008 312/140 |
| 5,398,451 A * | 3/1995 | Mesnel | ............... | B60J 10/2335 49/440 |
| 5,494,369 A * | 2/1996 | Stock | ............... | E06B 3/9681 403/178 |
| 5,692,340 A * | 12/1997 | Jinma | ............... | B60J 10/24 277/630 |
| 5,778,598 A * | 7/1998 | Ohanesian | ............... | B29C 47/0023 49/403 |
| 5,820,289 A * | 10/1998 | Kern | ............... | H02B 1/01 211/182 |
| 6,237,287 B1 * | 5/2001 | Nakagawa | ............... | B60J 10/21 49/479.1 |
| 6,520,571 B2 * | 2/2003 | Stemmer | ............... | E06B 7/2309 296/216.06 |
| 6,802,666 B1 * | 10/2004 | Bormann | ............... | B60J 10/233 296/93 |
| 6,936,320 B2 * | 8/2005 | Kubo | ............... | B60J 10/21 428/122 |
| 7,628,563 B2 * | 12/2009 | Winkler | ............... | A47B 43/003 211/189 |
| 7,677,003 B2 * | 3/2010 | Baughn | ............... | E06B 3/9682 52/473 |
| 7,758,798 B2 * | 7/2010 | Zohar | ............... | B29C 53/083 264/176.1 |
| 8,051,606 B2 * | 11/2011 | Maaß | ............... | B60J 10/21 49/479.1 |
| 8,667,738 B2 * | 3/2014 | Kondo | ............... | B60J 10/36 49/440 |
| 8,726,576 B2 * | 5/2014 | Kobayashi | ............... | B60J 10/042 49/441 |
| 2001/0034977 A1 * | 11/2001 | Hattori | ............... | B60J 10/24 49/479.1 |
| 2002/0026751 A1 * | 3/2002 | Kawai | ............... | B60J 10/22 49/479.1 |
| 2002/0062596 A1 * | 5/2002 | Palicki | ............... | B60J 10/80 49/441 |
| 2002/0139054 A1 * | 10/2002 | Schlachter | ............... | B60J 10/88 49/479.1 |
| 2004/0035082 A1 * | 2/2004 | Hudoba | ............... | E06B 9/02 52/656.7 |
| 2004/0088943 A1 * | 5/2004 | Kronenberg | ............... | E06B 3/667 52/656.9 |
| 2004/0216384 A1 * | 11/2004 | Teramoto | ............... | B60J 10/24 49/479.1 |
| 2005/0050800 A1 * | 3/2005 | Ueda | ............... | B60J 10/21 49/479.1 |
| 2005/0053761 A1 * | 3/2005 | Murase | ............... | B60R 21/205 428/122 |
| 2006/0162256 A1 * | 7/2006 | Tsuchida | ............... | B60J 10/79 49/479.1 |
| 2007/0175102 A1 * | 8/2007 | Teramoto | ............... | B60J 10/74 49/441 |
| 2010/0192508 A1 * | 8/2010 | Subra | ............... | E06B 3/9616 52/656.9 |
| 2011/0265387 A1 * | 11/2011 | Giroux | ............... | E06B 3/964 49/479.1 |
| 2013/0019558 A1 * | 1/2013 | Tseng | ............... | E06B 3/9644 52/656.9 |
| 2013/0205706 A1 * | 8/2013 | Beranek | ............... | E06B 3/9682 52/656.9 |
| 2014/0059940 A1 * | 3/2014 | Eguchi | ............... | B60J 10/0017 49/479.1 |

FOREIGN PATENT DOCUMENTS

| | | | | |
|---|---|---|---|---|
| DE | 202010008264 U1 | 2/2011 | | |
| DE | 102011107060 A1 | 1/2013 | | |
| FR | 2642809 A1 * | 8/1990 | ............. | B60J 10/21 |
| FR | 3007785 A1 | 1/2015 | | |
| GB | 2106974 A * | 4/1983 | ............. | E06B 7/2309 |
| WO | 9108367 A1 | 6/1991 | | |

\* cited by examiner

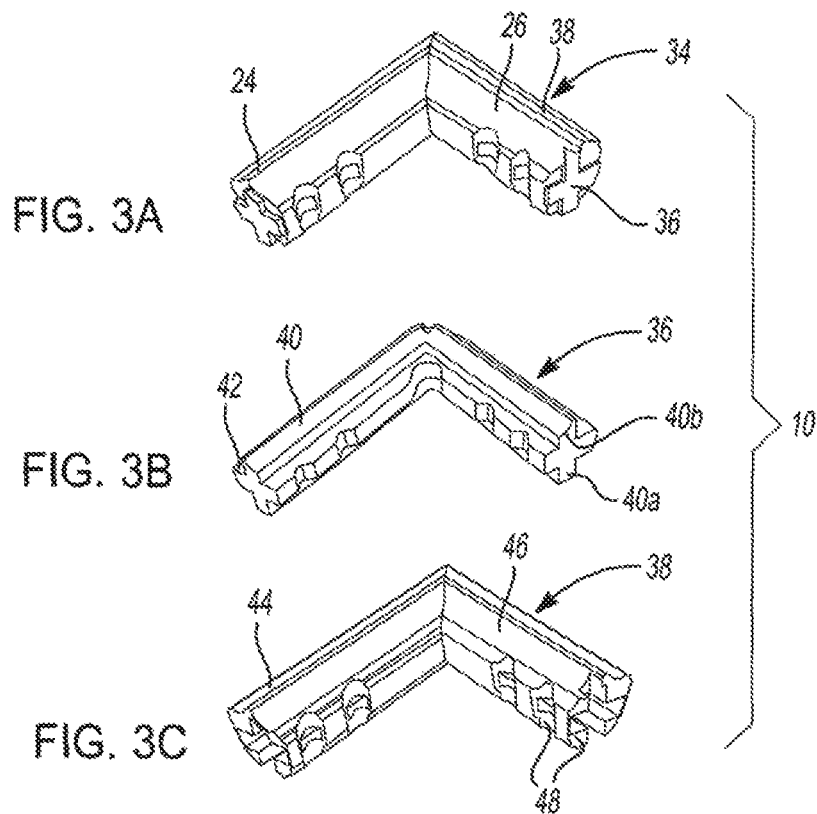
FIG. 3A
FIG. 3B
FIG. 3C
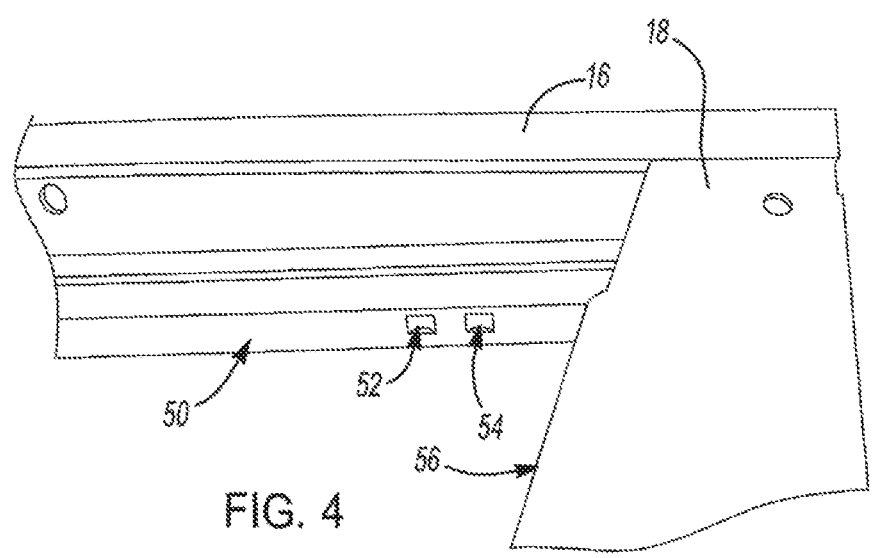
FIG. 4

EXTRUDED MEMBER CORNER CONNECTION

FIELD

The invention relates generally to a connector for coupling frame members, and more particularly to an internal connector for connecting adjoining tubes of a motor vehicle door frame.

BACKGROUND

The statements in this section merely provide background information related to the present disclosure and may or may not constitute prior art.

In common motor vehicle door frame assemblies, the corner joints between horizontal frame members and vertical or pillar members are normally welded. This initially requires both members to be machined, stamped, or ground to create a pre-weld joint geometry. After welding, weld joint spatter and slag must be removed so the finished joint is ready for subsequent painting. The cost of weld preparation and subsequent weld joint cleaning adds both time delay and cost to door frame construction.

While insert designs are known which can be placed in the corners or joint areas of door frame members, such designs are complex and may not provide the necessary joint strength without the addition of further reinforcement features. This field can therefore benefit from improved joint connecting devices.

SUMMARY

A connecting device for coupling first and second members includes a body having a first leg and a second leg integrally connected to the first leg. The first and the second legs are oriented at an angle with respect to each other. A rigid material core extends through the first leg and the second leg. A resilient material sleeve commonly covers the core of both the first leg and the second leg. At least one depression is disposed in each of the first leg and the second leg extending into the sleeve. The first leg is adapted to be frictionally received in a first member and the second leg is adapted to be frictionally received in a second member to couple the first member to the second member.

In one aspect, the core includes a first core member integrally connected to a second core member such that the core defines a geometric shape.

In another aspect, the first core member is angularly oriented with respect to the second core member such that the geometric shape defines a cross-shape.

In another aspect, the at least one depression disposed in each of the first leg and the second leg comprise first and second depressions disposed in each of the first leg and the second leg extending entirely through the sleeve.

In another aspect, each of the first and second depressions further extend partially into the core.

In another aspect, the sleeve includes at least one rib extending outwardly from a face of the sleeve.

In another aspect, the at least one rib includes at least first and second ribs remotely positioned from each other about the sleeve, the first rib and the second rib adapted to be elastically compressed when the first leg is frictionally received in the first member and the second leg is frictionally received in the second member.

In another aspect, the at least one rib includes at least three ribs positioned about the sleeve, the at least three ribs being individually elastically compressed when the first leg is frictionally received in the first member and the second leg is frictionally received in the second member.

In another aspect, a relief notch is disposed on an inside facing corner between the first leg and the second leg of the rigid material core.

In another aspect, each of the first leg and the second leg include laterally extending walls arranged in equal angular increments about a longitudinal centerline of each of the first leg and the second legs.

In another aspect, individual ones of the laterally extending walls include recessed portions shaped to conform with an inside facing wall of either the first member or the second member.

A connecting device for coupling first and second members is also provided. The connecting device includes a body having a first leg and a second leg integrally connected to the first leg. The first leg and the second leg are oriented at an angle with respect to each other. A rigid material core extends through the first leg and the second leg. The core includes a first core member integrally connected to a second core member. The first core member is angularly oriented with respect to the second core member such that the core defines a geometric-shape. A resilient material sleeve commonly covers the core of both the first leg and the second leg. The first leg is adapted to be frictionally received in a first member and the second leg is adapted to be frictionally received in a second member to couple the first member to the second member.

In one aspect, the sleeve includes at least one rib extending outwardly from a face of the sleeve.

In another aspect, the at least one rib includes at least a first rib and a second rib remotely positioned from each other about the sleeve, the first rib and the second rib both elastically compressed when the first leg is frictionally received in the first member and the second leg is frictionally received in the second member.

In another aspect, the each of the first leg and the second leg includes a first depression and a second depression individually aligned with a first dimple and a second dimple created in each of the first member and the second member.

In another aspect, the first depression and the second depression each extend through the sleeve and partially into the core.

In another aspect, the core for each of the first leg and the second leg includes laterally extending walls arranged in equal angular increments about a longitudinal centerline of each of the first leg and the second legs.

In another aspect, individual ones of the laterally extending walls include recessed portions shaped to conform with an inside facing wall of either the first member or the second member.

In another aspect, the core is a metal material and the sleeve is a polymeric material, the polymeric material overmolded onto the core after formation of the core.

A door system for a motor vehicle is provided. The door system includes a connector having a first leg and a second leg integrally connected to the first leg, the first and the second legs angularly oriented with respect to each other. Each of the first leg and the second leg include a rigid material core extending through both the first leg and the second leg; a resilient material sleeve at least partially covering the core; and a depression created in each of the first leg and the second leg extending through the sleeve to the core. A first frame member has a first dimple created before or after the first leg is frictionally received in the first frame member. The first dimple is positioned proximate to and extends into the depression of the first frame member to mechanically couple the first frame member to the first leg. A second frame member has a second dimple created before or after the second leg is frictionally received in the second frame member. The second dimple is positioned proximate to and extends into the depression of the second frame member to mechanically couple the second frame member to the second leg and thereby mechanically couple the first frame member to the second frame member.

Further aspects, examples, and advantages will become apparent by reference to the following description and appended drawings wherein like reference numbers refer to the same component, element or feature.

DRAWINGS

The drawings described herein are for illustration purposes only and are not intended to limit the scope of the present disclosure in any way.

FIG. 3A is a front perspective view of a connector assembly of FIG. 1;

FIG. 3B is a front perspective view of a core of the connector assembly of FIG. 3A;

FIG. 3C is a front perspective view of a resilient material sleeve of the connector assembly of FIG. 3A;

FIG. 4 is a side elevational view similar to area 2 of FIG. 1;

DETAILED DESCRIPTION

The following description is merely exemplary in nature and is not intended to limit the present disclosure, application, or uses.

Figure 1:
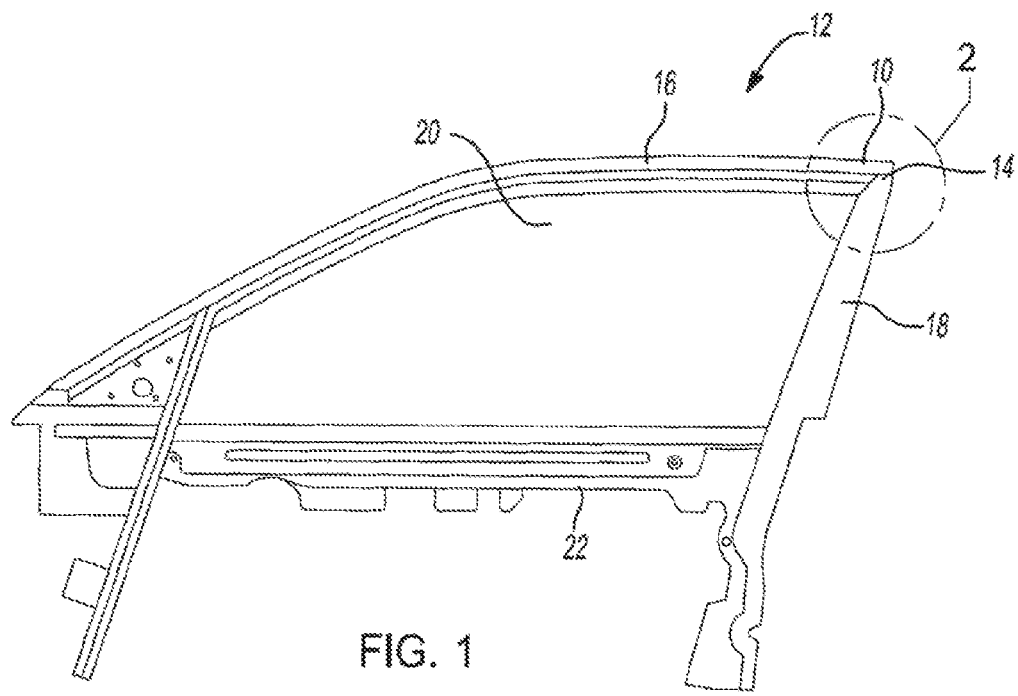
FIG. 1 is a side elevational view of an example of a motor vehicle door frame having an extruded member corner connection defining a connecting member of the present disclosure.

With reference to FIG. 1, a connecting system is generally indicated by reference number 10. According to several aspects, the connecting system 10 can be employed in a frame system 12 such as an exemplary vehicle door frame mounted to a motor vehicle (not shown). The connecting system 10 is used for example to connect a first member 16 such as an upper door frame member to a second member such as a vertical door frame member positioned proximate to a vehicle "B" pillar in a door closed position. The first member 16 and the second member 18 define a window opening into which is normally positioned a vertically movable window (not shown). The frame system 12 can also include additional frame members such as a stiffening frame member 22. The connecting system 10 can be used to replace a weld joint ground or machined at the junction between the first member 16 and the second member 18, and a subsequent weld joint which are presently used for coupling items such as the first member 16 to the second member 18 in motor vehicle door systems.

Referring to FIG. 2 and again to FIG. 1, the connecting system 10 includes a body 23 defining a connecting device, the body 23 or connecting device having a first leg 24 and a second leg 26 integrally connected to the first leg 24. The first leg 24 and the second leg 26 are oriented at an angle $\alpha$ with respect to each other, which according to several aspects defines a right or 90 degree angle. The angle $\alpha$, however, can vary to be greater than 90 degrees or less than 90 degrees as necessary to accommodate different geometries of the first member 16 and the second member 18. The first leg 24 is frictionally received in a correspondingly shaped cavity 28 created in the first member 16. Similarly, the second leg 26 is frictionally received in a correspondingly shaped cavity 30 created in the second member 18. When the connecting system first leg 24 and second leg 26 are frictionally fixed in position as shown, a joint 32 between the first member 16 and the second member 18 is created, substantially locking together the first member 16 and the second member 18.

Figure 2:
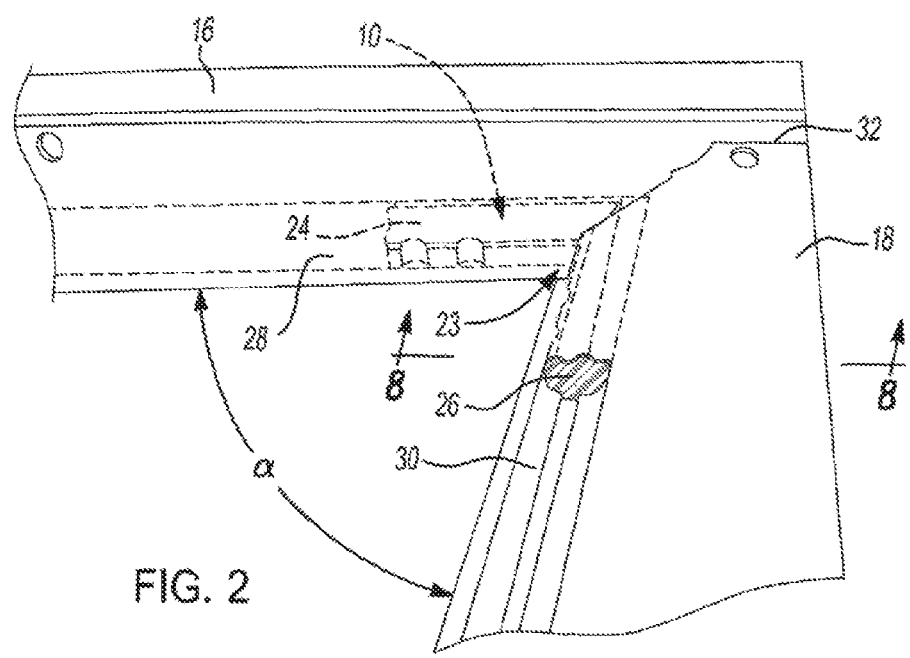
FIG. 2 is a side elevational view of area 2 of FIG. 1.

Referring to FIGS. 3A through 3C and again to FIGS. 1 through 2, according to several aspects, the connecting system 10 provides a connector assembly 34 having the first leg 24 and the second leg 26 integrally connected to the connector assembly 34. The first leg 24 and the second leg 26 both include a common rigid material core 36. A resilient polymeric material sleeve 38 substantially and commonly covers the core 36 of both the first leg 24 and the second leg 26.

As more specifically shown in FIG. 3B, the core 36 defines a geometric shape. The geometric shape of the core 36 can include any of multiple shapes including but not limited to a circle, an oval, a rectangle, a star, and the like. According to several aspects the geometric shape can include a cross having a first first core member 40 integrally connected to and oriented at a right angle with respect to a second core member 42. Each of the first and second core members 40, 42 can be rectangular shaped such as a portion 40a, or have other geometric shapes. Each of the first and second core members 40, 42 can also include additional features such as a concave shaped surface 40b.

As more specifically shown in FIG. 3C, the resilient polymeric material sleeve 38 can be pre-molded and then inserted onto the first leg 26 and the second leg 28, such that a first leg portion 44 covers the first leg 26, and a second leg portion 46 covers the second leg 28. If the resilient polymeric material sleeve 38 is pre-molded, it can also include one or more resilient fingers 48 that deflect to allow the first leg portion 44 and the second leg portion 46 to receive the first leg 26 and the second leg 28 respectively. According to other aspects, as will be discussed in reference to FIG. 6, the resilient polymeric material sleeve 38 can be over-molded onto the core 36 as a single, uniform layer, for example using an injection molding process. The resilient fingers 48 can be omitted or incorporated as a single member in the over-molded aspect.

Figure 5:
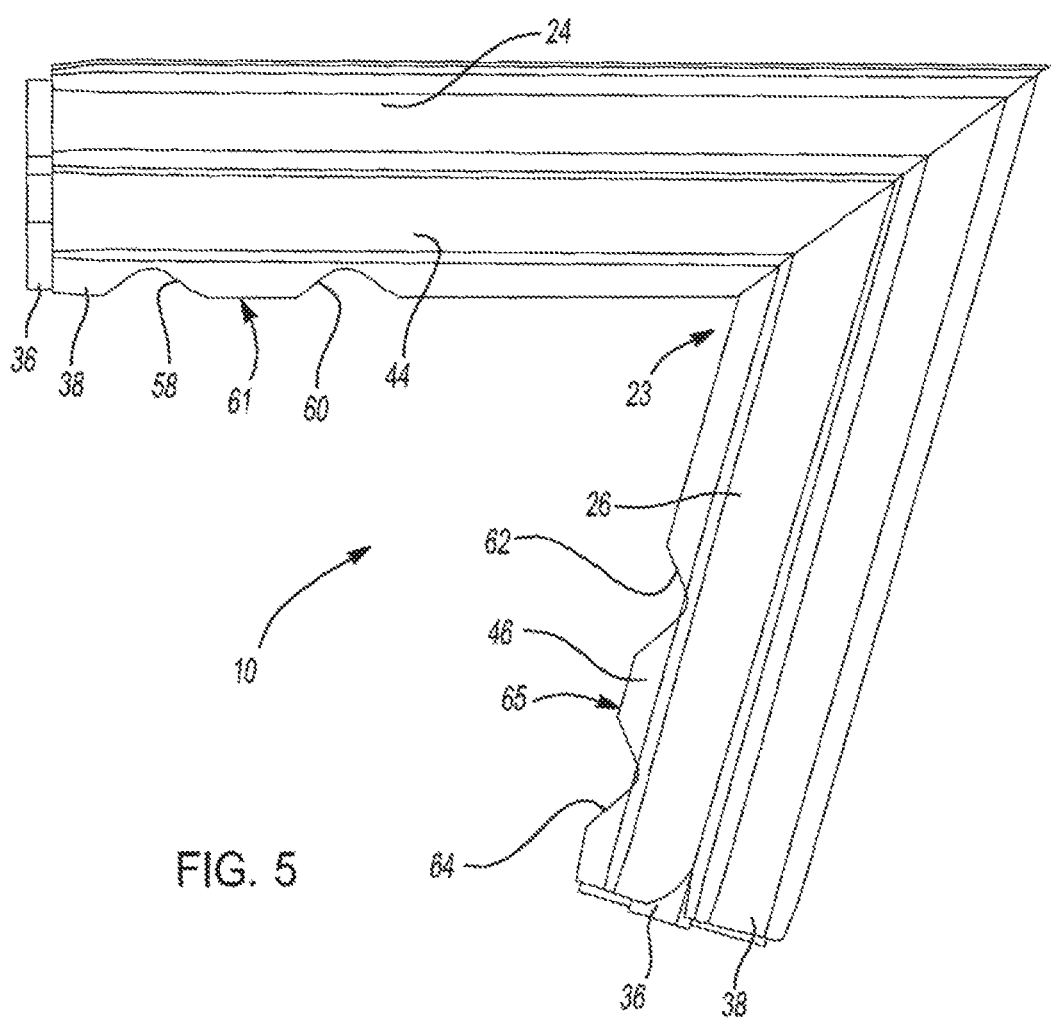
FIG. 5 is a side elevational view of another aspect of a connector assembly of the present disclosure.

Referring now to FIG. 4, before or after the connecting system 10 body 23 is frictionally received in both the first member 16 and the second member 18 an inner facing wall 50 of the first member 16 has dimples created therein, such as a first dimple 52 and a second dimple 54. The first and second dimples 52, 54 assist in mechanically coupling the first member 16 to the second member 18 using the connecting system 10, as will be described in greater detail in reference to FIG. 5. A similar inner facing wall 56 of the second member 18 also has at least one, and according to several aspects, third and fourth dimples (not visible in this view) created therein.

Referring to FIG. 5, and again to FIG. 4, a first recess 58 and a second recess 60 are created in an inside facing wall 61 of the first leg portion 44 of the body 23 of connecting system 10. Similarly, a third recess 62 and a fourth recess 64 are created in an inside facing wall 65 of the second leg portion 46. The first recess 58 is positioned to receive the first dimple 52 created in the first member 16 and the second recess 60 is positioned to receive the second dimple 54. Similarly, the third recess 62 is positioned to receive the third dimple created in the inner facing wall 56 of the second member 18, and the fourth recess 60 is positioned to receive the fourth dimple created in the inner facing wall 56 of the second member 18. As each dimple extends into the associated recess, an additional mechanical "lock" is created that enhances the frictional contact provided between the resilient polymeric material sleeve 38 and the inner surfaces of the first and second members 16, 18. This additional mechanical lock mitigates against the first leg 24 of the connecting system 10 body 23 releasing from the first member 16, and mitigates against the second leg 26 releasing from the second member 18.

Figure 6:
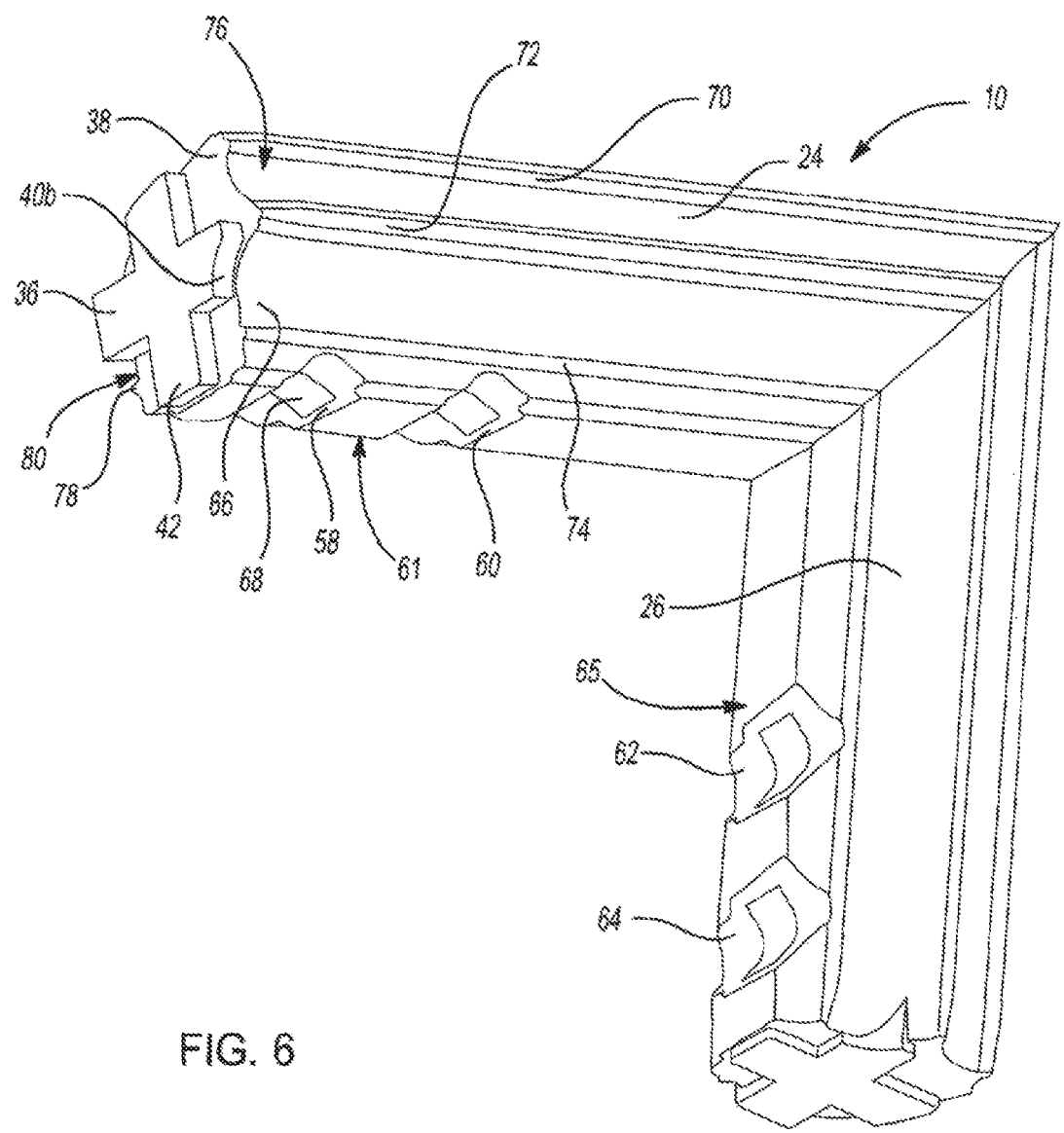
FIG. 6 is a front perspective view of the connector assembly of FIG. 5.

Referring to FIG. 6, in one aspect of the connecting system 10 the resilient polymeric material sleeve 38 is over-molded onto the core 36 as a one-piece homogeneous covering, and is therefore substantially bonded onto outside facing surfaces of the core 36. In this aspect, one or more surfaces such as a concave surface 66 can be provided which match a corresponding shape of the core 36 such as the concave shaped surface 40b. According to several aspects the recesses such as the first recess 58 and the second recess 60 can extend either partially or entirely through a thickness of the resilient material sleeve 38 and in further aspects can also extend at least partially into the material of the core 36, for example at an area 68.

The resilient polymeric material sleeve 38 can also provide at least one and according to several aspects, multiple raised ribs, including a first raised rib 70, a second raised rib 72, and a third raised rib 74 each extending outwardly from a surface 76 of the resilient polymeric material sleeve 38. At least one and according to several aspects, multiple raised ribs such as a fourth raised rib 78 are oppositely directed from the first raised rib 70, the second raised rib 72, and the third raised rib 74, and extend outwardly from a surface 80 of the resilient material sleeve 38. The raised ribs are elastically compressible members which assist in maintaining frictional contact between the connecting system 10 and either of the first or the second members 16, 18. The raised ribs also allow for minor construction, installation geometry, or dimensional differences between the connecting device of the present disclosure, and the members to be joined such as the first member 16 and the second member 18.

Figure 7:
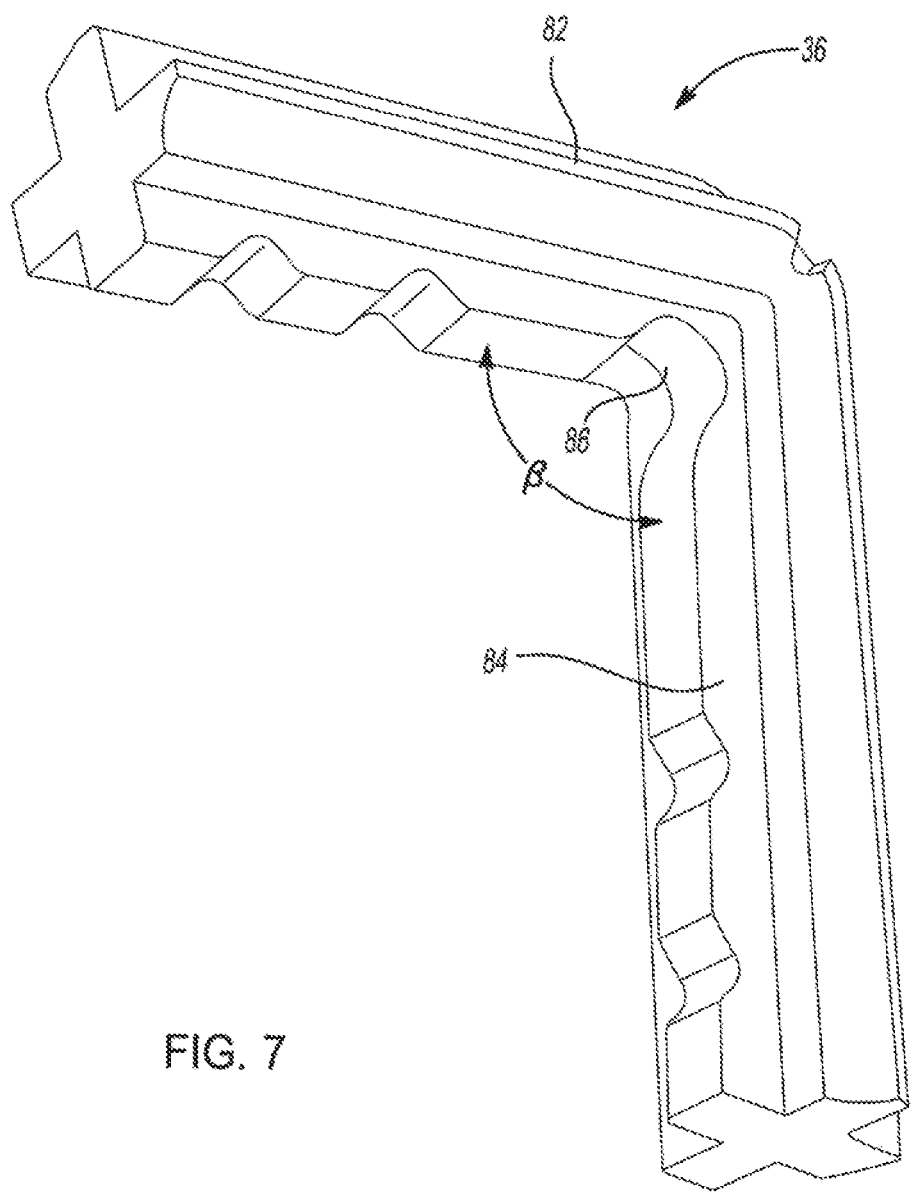
FIG. 7 is a front perspective view of a core for the connector assembly of FIG. 5.

Referring to FIG. 7 and again to FIG. 2, the core 36 can be made for example by a machining, casting or forging process, and can be made of a metal such as aluminum or steel. The core 36 includes a first arm 82 and a second arm 84. The second arm 84 is oriented at an angle β with respect to the first arm 82, which according to several aspects is substantially equal to angle α previously described in reference to FIG. 2. A relief notch 86 is provided at an inner corner defined at a junction between the first arm 82 and the second arm 84. The relief notch 86 is provided to allow full insertion of the first arm 82 within the first leg 24 into the first member 16, and full insertion of the second arm 84 and the second leg 26 into the second member 18.

Figure 8:
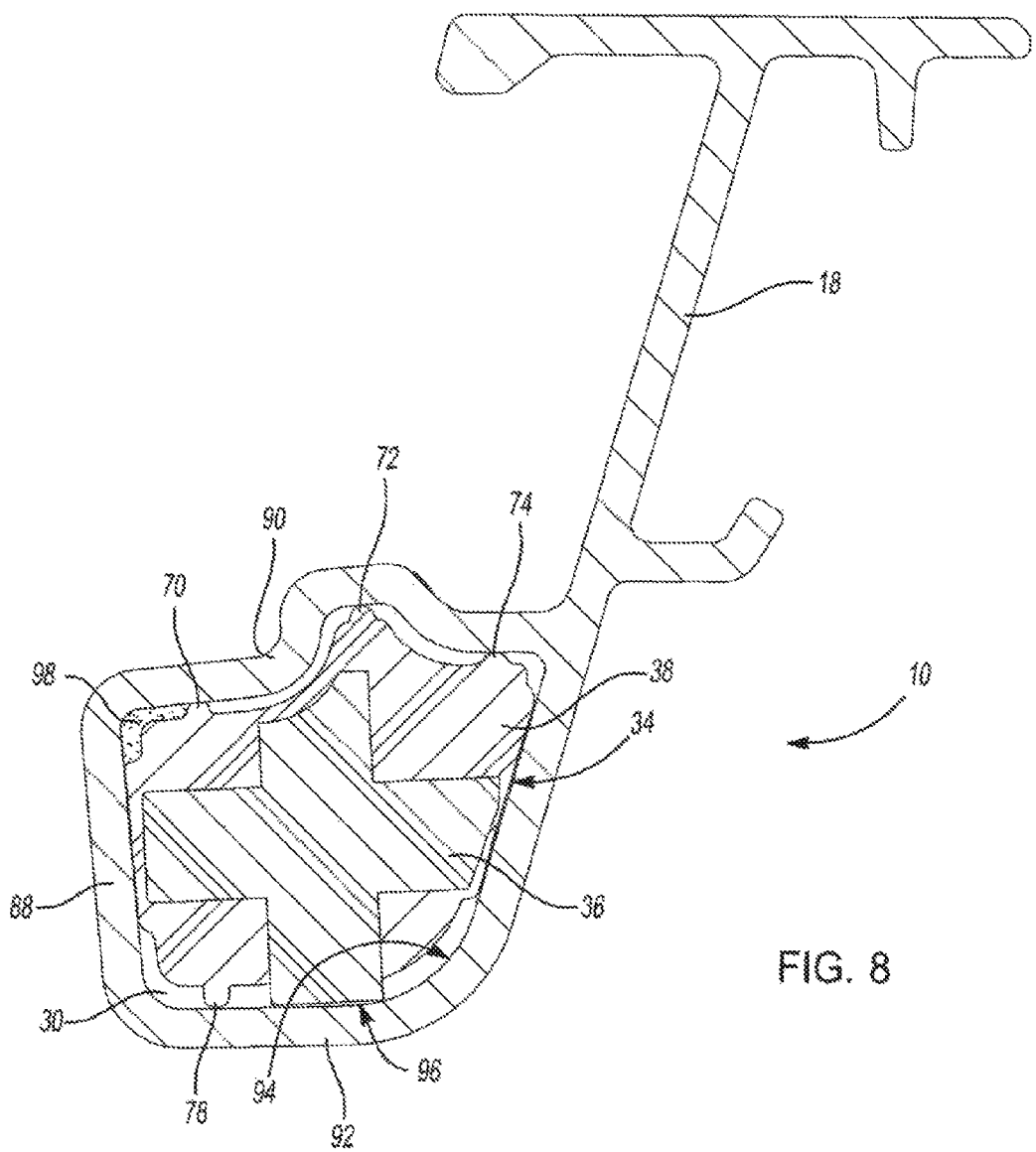
FIG. 8 is cross sectional end elevational view taken at section 8 of FIG. 2.

Referring to FIG. 8, the connector assembly 34 of the connecting system 10 is shown positioned within the cavity 30 created in the second member 18. The cavity 30 is defined by an encompassing wall 88. The first raised rib 70, the second raised rib 72, and the third raised rib 74 of the resilient polymeric material sleeve 38 directly contact a first wall portion 90 of the wall 88 and thereby elastically compress. The fourth raised rib 78 directly contacts a second wall portion 92 and thereby elastically compresses. The second wall portion 92 is oppositely facing with respect to the first wall portion 90. Other segments of the resilient sleeve 38 can also come into direct contact with an inner facing surface 94 of the wall 88 to add further frictional engagement to help frictionally retain the connector assembly 34 of the connecting system 10 within the cavity 30 created in the second member 18. To avoid metal-to-metal contact, a gap 96 can be maintained between any exposed portions of the core 36 and the wall 88. To provide additional retention capability, an adhesive 98 can also be applied to outward facing surfaces of the connector assembly 34, which contacts and adheres to the inner facing surface 94.

According to several aspects, a connecting device for coupling first and second members 16, 18 includes a body 23 having a first leg 24 and a second leg 26 integrally connected to the first leg 24. The first and the second legs 24, 26 are oriented at an angle α with respect to each other. The first leg 24 and the second leg 26 both include a rigid material core 36. A resilient polymeric material sleeve 38 commonly covers the core 36 of both the first leg 24 and the second leg 26. The first leg 24 is frictionally received in a first member 16 and the second leg 26 is frictionally received in a second member 18 to couple the first member 16 to the second member 18.

The description of the invention is merely exemplary in nature and variations that do not depart from the gist of the invention are intended to be within the scope of the invention. Such variations are not to be regarded as a departure from the spirit and scope of the invention.

The following is claimed:

1. A connecting device for coupling first and second members, the connecting device comprising:
   a body having a first leg and a second leg integrally connected to the first leg, the first and the second legs oriented at an angle with respect to each other;
   a rigid material core extending through the first leg and the second leg;
   a resilient material sleeve covering the core of both the first leg and the second leg; and
   first and second depressions disposed in each of the first leg and the second leg extending through the sleeve;
   wherein the first leg is frictionally received in the first member and the second leg frictionally received in the second member to couple the first member to the second member.

2. The connecting device of claim 1, wherein the core includes a first core member integrally connected to a second core member defining a geometric shape.

3. The connecting device of claim 2, wherein the first core member is angularly oriented with respect to the second core member such that the geometric shape of the core defines a cross-shape.

4. The connecting device of claim 1, wherein each of the first and second depressions further extend partially into the core.

5. The connecting device of claim 1, wherein the sleeve includes at least one rib extending outwardly from a face of the sleeve.

6. The connecting device of claim 5, wherein the at least one rib includes first and second ribs remotely positioned from each other about the sleeve, the first rib and the second rib elastically compressed when the first leg is frictionally received in the first member and the second leg is frictionally received in the second member.

7. The connecting device of claim 5, wherein the at least one rib includes multiple ribs positioned about the sleeve, each of the multiple ribs elastically compressed when the first leg is frictionally received in the first member and the second leg is frictionally received in the second member.

8. The connecting device of claim 1, further including a relief notch disposed on an inside facing corner between the first leg and the second leg of the rigid material core.

9. The connecting device of claim 1, wherein each of the first leg and the second leg include laterally extending walls arranged in equal angular increments about a longitudinal centerline of each of the first leg and the second legs.

10. The connecting device of claim 9, wherein individual ones of the laterally extending walls include recessed portions shaped to conform with an inside facing wall of either the first member or the second member.

11. The connecting device of claim 1, wherein the resilient material sleeve commonly covers the core of both the first leg and the second leg.

12. The connecting device of claim 1, wherein a portion of the resilient material core independent of the first and the second depressions is lacking the resilient material sleeve.

13. The connecting device of claim 1, wherein a shape of the first leg and the second leg corresponding to a shape of the first member and the second member.

14. A connecting device for coupling first and second members, the connecting device comprising:
- a body having a first leg and a second leg integrally connected to the first leg, the first leg and the second leg oriented at an angle with respect to each other;
- a rigid material core extending through both the first leg and the second leg, the core including a first core member integrally connected to a second core member, the first core member angularly oriented with respect to the second core member such that the core defines a geometric shape;
- a resilient material sleeve commonly covering the core of both the first leg and the second leg, the first leg frictionally received in the first member and the second leg frictionally received in the second member to couple the first member to the second member, and
- the sleeve including at least one rib extending outwardly from a face of the sleeve, the at least one rib including at least a first rib and a second rib remotely positioned from each other about the sleeve, the first rib and the second rib both elastically compressed when the first leg is frictionally received in the first member and the second leg is frictionally received in the second member.

15. The connecting device of claim 14, wherein each of the first leg and the second leg includes a first depression and a second depression individually aligned with a first dimple and a second dimple disposed in each of the first member and the second member.

16. The connecting device of claim 15, wherein the first depression and the second depression each extend through the sleeve and partially into the core.

17. The connecting device of claim 14, wherein the core for each of the first leg and the second leg includes laterally extending walls arranged in equal angular increments about a longitudinal centerline of each of the first leg and the second legs.

18. The connecting device of claim 17, wherein individual ones of the laterally extending walls include recessed portions shaped to conform with an inside facing wall of either the first member or the second member.

19. The connecting device of claim 14, wherein the core is a metal material and the sleeve is a polymeric material, the polymeric material over-molded onto the core after formation of the core.

20. A door system for a motor vehicle, comprising:
- a connector having a first leg and a second leg integrally connected to the first leg, the first and the second legs angularly oriented with respect to each other, each of the first leg and the second leg including:
  - a rigid material core extending through both the first leg and the second leg;
  - a resilient material sleeve at least partially covering the core; and
  - a depression created in each of the first leg and the second leg extending through the sleeve to the core;
- a first frame member having a first dimple created before or after the first leg is frictionally received in the first frame member, the first dimple positioned proximate to and extending into the depression of the first frame member to mechanically couple the first frame member to the first leg; and
- a second frame member having a second dimple created before or after the second leg is frictionally received in the second frame member, the second dimple positioned proximate to and extending into the depression of the second frame member to mechanically couple the second frame member to the second leg and thereby mechanically couple the first frame member to the second frame member.

* * * * *